United States Patent [19]
Clark

[11] 3,976,275
[45] Aug. 24, 1976

[54] MIRROR HEAD ADJUSTING MECHANISM
[75] Inventor: Paul D. Clark, Buckingham, Pa.
[73] Assignee: Delbar Products, Inc., Perkasie, Pa.
[22] Filed: Sept. 23, 1975
[21] Appl. No.: 615,860

[52] U.S. Cl................................ 248/487; 248/278
[51] Int. Cl.² ..................... B60M 1/06; A47G 1/24
[58] Field of Search ........... 248/477, 478, 479, 485, 248/486, 487, 274, 276, 278, 291, 299, 230

[56] References Cited
UNITED STATES PATENTS

| | | | |
|---|---|---|---|
| 2,360,248 | 10/1944 | Mace | 248/291 X |
| 3,018,081 | 1/1962 | Waldbauer | 248/230 |
| 3,184,199 | 5/1965 | Clark et al. | 248/299 X |

FOREIGN PATENTS OR APPLICATIONS

| 227,550 | 10/1962 | Austria | 248/484 |
|---|---|---|---|

Primary Examiner—J. Franklin Foss
Attorney, Agent, or Firm—Reising, Ethington, Barnard, Perry & Brooks

[57] ABSTRACT

An adjustable mirror assembly comprising a mirror head having an open shell on one side and a mirror member mounted within the open side of said shell, said shell and said mirror member cooperating to define an open space therebetween, a mirror head support arm extending through an opening in said shell and terminating in an end disposed within said open space, and means for frictionally mounting the shell upon the support arm to enable the mirror head to be tilted so that the distance between said support arm end and said mirror member can be varied to adjust the rearward field of view of the mirror member.

6 Claims, 6 Drawing Figures

MIRROR HEAD ADJUSTING MECHANISM

BACKGROUND OF THE INVENTION

The invention relates to an adjustable mounting system for a mirror head. More specifically, the invention relates to a hollow or enclosed mirror head which includes an internal mounting structure which enables the head to be both rotated and tilted relative to a vehicle mounted support arm which projects interiorly of the head.

While having general applicability as a mirror mounting system, the present invention is particularly applicable to relatively large rear view mirrors of the type mounted exteriorly on utility vehicles such as light trucks, vans and camping vehicles. It is common practice today to mount such mirrors in a cantilever fashion wherein the mirror head is mounted at the end of a support arm such as shown in U.S. Pat. Nos. 3,667,718 Goslin et al., and 3,833,198 Holzman. In mirrors of this type the horizontal and vertical fields of view are adjusted by rotating the mirror head relative to a support arm and rotating the mirror head and support arm together relative to a bracket or other support structure.

The present invention is directed to a simplified mounting structure wherein the mirror head may be both rotated and tilted or inclined to a support arm to adjust both the horizontal and vertical rearward fields of vision.

SUMMARY OF THE INVENTION

The present invention includes a hollow or enclosed mirror head into which one end of a support arm projects and is connected to an internal mounting structure to permit the mirror head to be both rotated and tilted to the arm for varying the horizontal and vertical fields of vision. The other end of the support arm is securely mounted to the vehicle body. The internal mounting structure includes a first supporting portion which circumferentially engages the support arm to enable the mirror head to be both rotated and tilted relative to the major longitudinal axis of the arm. The internal mounting structure includes a second supporting portion longitudinally spaced from the first portion and frictionally engaging the support arm to retain the mirror head in various rotated or tilted positions. Thus, the internal mounting structure engages the support arm at two spaced positions along the latter's major axis whereby tilting of the mirror head occurs about one point along said axis while rotation of the head is about said axis.

More specifically, the internal mounting structure includes a first generally planar bracket or support means circumferentially engaging the support arm so as to allow both rotation and tilting of the mirror head. The internal mounting structure also includes a bifurcated spring element adapted to frictionally engage the support arm in an area axially spaced from the first bracket means and to thereby provide means for retaining the mirror head in various rotated or tilted positions.

The details of the invention are set forth in the drawings and the detailed description which follows.

Figure 1:
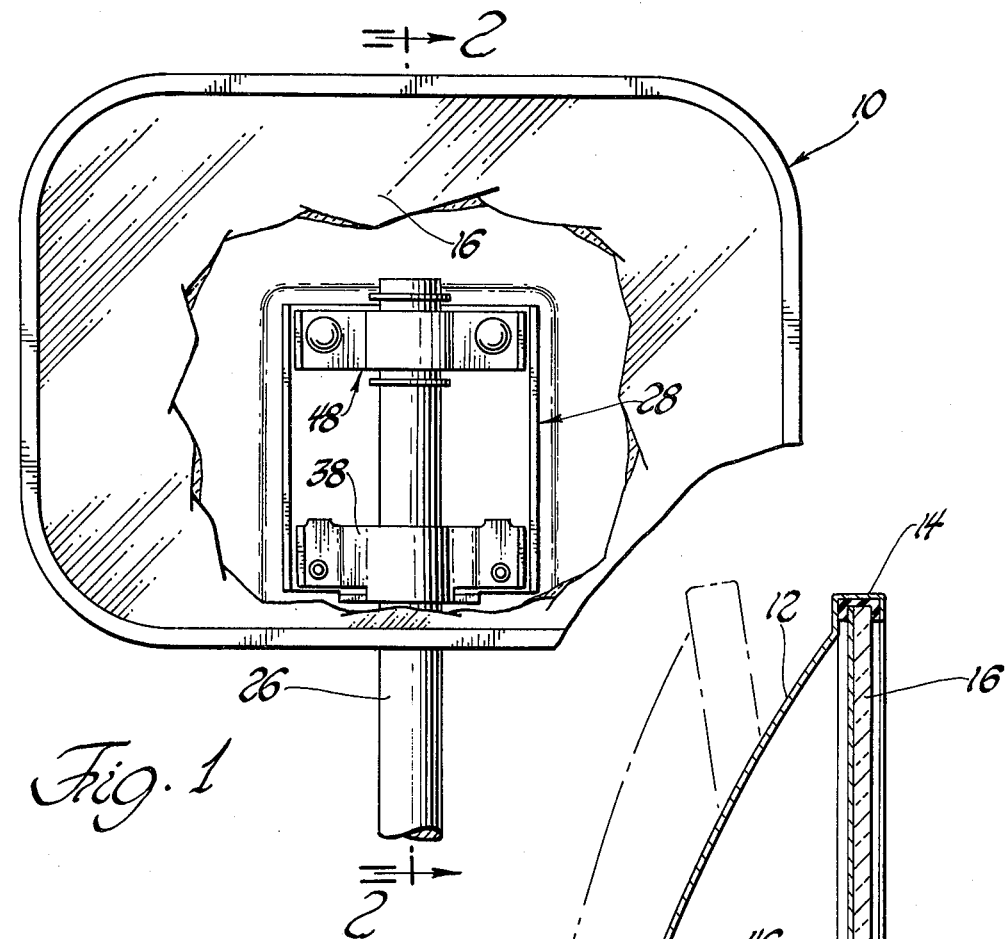
FIG. 1 is a front elevational view of one modification of the invention.

A first modification of the invention is shown in FIGS. 1 through 4 of the drawings A mirror head is indicated generally at 10 and includes a hollow shell or casing 12 having an open side surrounded by a rim portion 14 within which a mirror member 16 is suitably retained. Shell or casing 12 includes a generally flat portion 18 spaced from the mirror member 16 so as to define an open space 20 therebetween.

Mirror shell 12 also includes a second wall portion 22 having an opening 24 formed therein. A mirror support arm 26 is adapted to extend through shell opening 24 and is operably connected to a mirror head support structure indicated generally at 28. Support arm 26 includes an end, not shown, adapted to be suitably secured to a vehicle body.

Figures 2, 3:
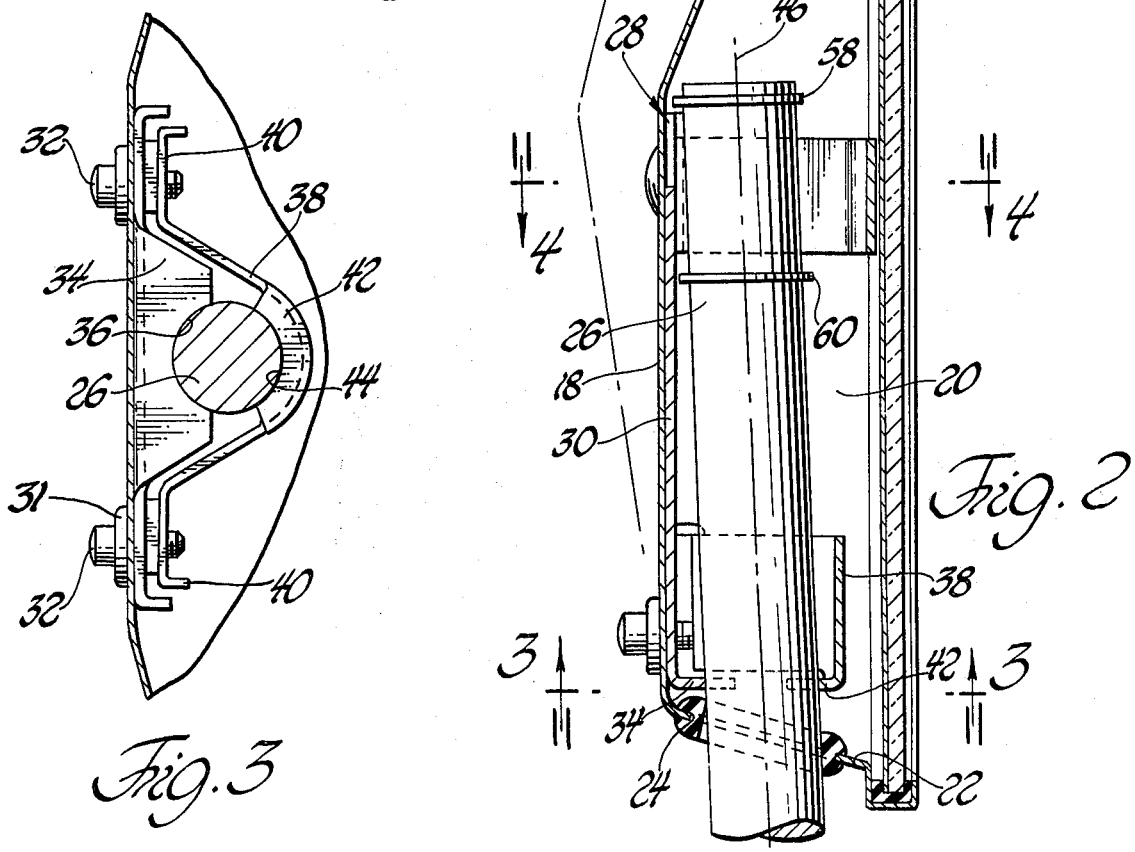
FIG. 2 is a side sectional view along line 2—2 of FIG. 1.
FIG. 3 is a cross-sectional view along line 3—3 of FIG. 2.
Figure 4:
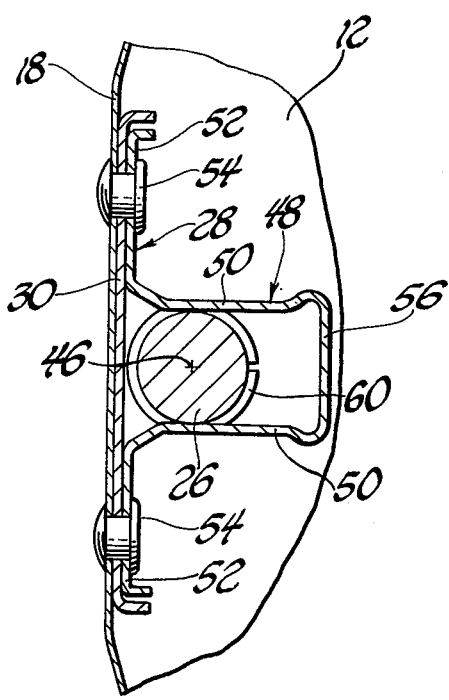
FIG. 4 is a sectional view along line 4—4 of FIG. 2.

Mirror head support structure 28 includes a plate member 30 adapted to be suitably mounted within the mirror shell 12 and upon wall portion 18 thereof. Wall portion 18 and plate 30 are suitably perforated proximate their lower ends whereby hollow rivets 31 secure the plate to shell 12. Screws 32 extend through rivets 31 and are adapted to engage a member 32, infra. As best seen in FIGS. 2 and 3, the lower end of plate 30 includes an inwardly flanged portion 34 which extends generally transversely within open space 20 and includes an arcuately recessed portion 36 which coacts in a supported relationship with arm 26. A generally U-shaped bracket member 38 is secured to plate 30 by screw members 32 which threadably engage terminal leg flanges 40. Bracket member 38 also includes an inwardly turned flange portion 42 having an arcuately recessed portion 44 aligned with and transversely spaced from recessed portion 36 of plate section 34. Flange recess 44 is also adapted to circumferentially engage support arm 26. Thus, mirror head support arm 26 is clampingly engaged about its periphery between plate portion 34 and bracket portion 42. The degree of frictional or clamping engagement between recesses 34 and 44 with support arm 26 is adjustable through screws 32 and assists in retaining the mirror head 10 in any position to which it is rotated by the user.

Even though in clamping engagement therewith, bracket member 38 is sufficiently flexible to permit the mirror head 10 to be tilted relative to support arm 26.

Mirror head support arm 26 includes a longitudinally extending major axis 46 which is coaxially disposed to arcuately recessed portions 36 and 44 respectively of plate 34 and bracket 38 as well as with respect to hole 24 in shell wall portion 22.

Spaced above bracket 38 is a generally U-shaped spring member 48 having leg portions 50 which terminate in outwardly extending flange members 52 mounted against plate 30. Wall portion 18, plate 30 and spring flanges 52 include aligned holes formed therethrough enabling the plate and spring member 48 to be fixed to mirror head shell 12 through suitable fastening means such as rivets 54.

Spring member 48 is so formed that legs 50 have an inward bias so as to frictionally engage with mirror support arm 26. Legs 50 of spring element 48 are suitably elongated as to permit the mirror head to be moved or tilted transversely of major axis 46 of support arm 26. At the same time, mirror head 10 can be rotated about support arm axis 46. The frictional engagement between support arm 26 and spring legs 50 is such as to retain the mirror head in any position to which the head has been rotated or tilted relative to support arm 26.

Thus, assuming support arm 26 is suitably mounted upon a vehicle so as to extend vertically as viewed in FIG. 1, mirror head 10 can be rotated about major axis 46 to vary the rearward horizontal field of view of mirror member 16. At the same time, the vertical rearward field of vision can be adjusted by tilting the mirror head relative to said major axis 46. The amount of tilting or inclining movement of mirror head 10 relative to support arm 26 is basically determined by the length of spring legs 50 which are connected at their outer ends by a spring section 56 to provide an outer stop which prevents the support arm from directly contacting mirror member 16. In turn, the length of spring legs 50 are limited by the depth of the space 20 between shell wall portion 18 and mirror member 16. Thus, greater tilting movement can be achieved by making a deeper mirror shell to increase the depth of space 20 and thereby permitting the use of longer spring legs 50.

Referring particularly to FIG. 2, transversely extending and aligned flanges 34 and 42 of plate 30 and bracket 38 respectively lay in a common plane which extends generally transversely of support arm axis 46. The intersection of this plane and axis 46 defines a point on the axis about which the mirror head can be tilted or inclined.

In order to prevent the inadvertent removal of mirror head 10 from support arm 26, suitable stop means 58 and 60 are provided on the support arm. The stop means 58 and 60 may comprise C-clamp type members adapted to snap within suitable circumferential recesses formed in support arm 26.

An elastomeric annular member 62 is suitably disposed about hole 24 in wall portion 22 to generally seal the interior of mirror shell 12.

Figure 5:
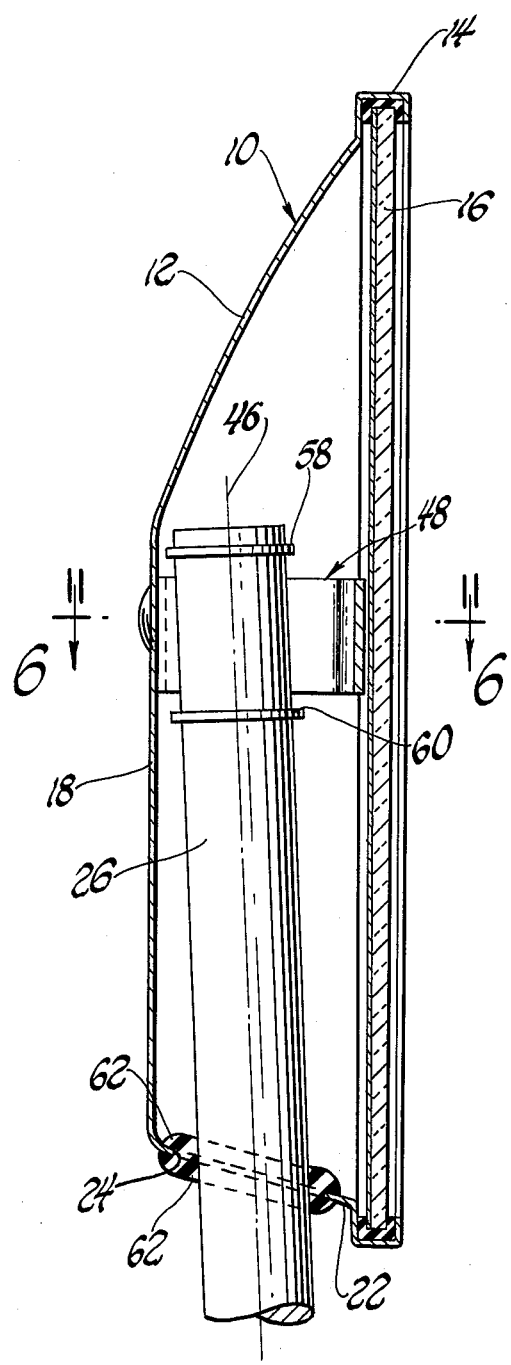
FIG. 5 is a side elevational view of a second modification of the invention.
Figure 6:
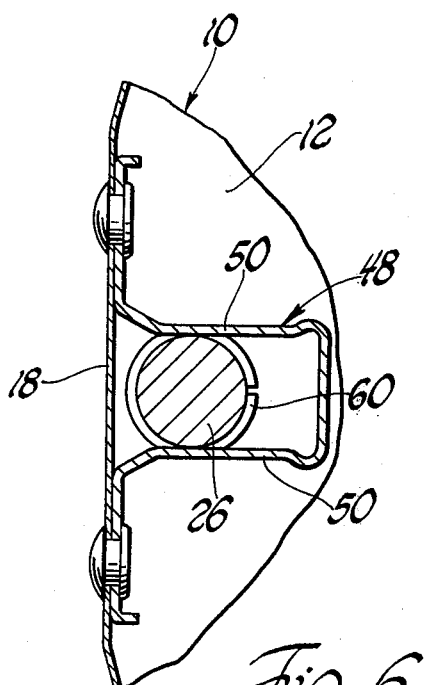
FIG. 6 is a view along line 6—6 of FIG. 5.

A simplified and light weight version of the invention is shown in FIGS. 5 and 6. In this case like components are indicated with the same numerals as applied to the modification of FIGS. 1 through 4. In the modification of FIGS. 5 and 6, plate 30 and bracket 38 are eliminated whereby the lower end of the mirror head is supported directly for tilting movement upon support arm 26 by the elastomeric seal member 62 mounted in hole 24 of wall portion 22.

It is apparent that other modifications may be made within the scope of the invention as set forth in the hereinafter appended claims.

What is claimed is:

1. An adjustable mirror assembly comprising a mirror head having a hollow shell open on one side and a planar mirror member mounted within the open side of said shell, a mirror head support arm extending through an opening in said hollow shell and projecting within the space between said shell and said mirror member, said arm including a major longitudinal axis, first means for adjustably mounting the mirror head upon said support arm such that the plane of said mirror member may be variably inclined to the major axis of the support arm, including to a position wherein said planar mirror is parallel to said major axis second means spaced along said major axis from said first means for frictionally engaging the mirror head to the support arm whereby the mirror head may be frictionally retained in various inclined positions relative to the major axis of the support arm, and stop means for limiting movement of said mirror head along the major axis of the support arm.

2. An adjustable mirror assembly comprising a mirror head having a hollow shell open on one side and a mirror member mounted within the open side of said shell, said shell including a first wall portion spaced from said mirror member and a second wall portion proximate said first wall portion and angularly disposed relative thereto, a mirror head support arm extending through an opening in said second wall portion and projecting within the space between said first wall portion and said mirror member, an annular resilient member disposed about the opening in said second wall portion and circumferentially engaging the support arm enabling the mirror head to be rotated and tilted about said arm, and a generally U-shaped spring element mounted at its open end upon said first wall portion and projecting within the space between said first wall portion and the mirror member, the legs of said U-shaped element frictionally engaging the support arm therebetween enabling the mirror head to be retained in tilted and rotated positions relative to said support arm by the frictional engagement between the U-shaped element and said support arm.

3. An adjustable mirror assembly comprising a mirror head having a shell open on one side and a mirror member mounted within the open side of said shell, said shell and said mirror member cooperating to define an open space therebetween, a mirror head support arm extending through an opening in said shell and projecting within said open space, a bracket member mounted within said shell proximate the opening therein, said bracket member circumferentially engaging the support arm enabling the mirror head to be rotated and tilted thereabout, and a generally U-shaped spring element mounted at its open end upon said shell remote from said bracket member and projecting within said open space, the legs of said U-shaped element frictionally engaging the support arm therebetween whereby the mirror head may be retained in rotated and tilted positions relative to said support arm by the frictional engagement between the U-shaped element and said support arm.

4. An adjustable mirror assembly comprising a mirror head having a shell open on one side and a planar mirror member mounted within the open side of said shell, said shell and said mirror member cooperating to define an open space therebetween, a mirror head support arm extending through an opening in said shell and projecting within said open space, said arm having a longitudinal major axis, first and second bracket members mounted within said shell proximate the opening therein, said bracket members including oppositely facing bearing portions extending transversely of the major axis and each circumferentially engaging the support arm enabling the planar mirror member to be rotated about and variously inclined relative to said major axis, and spring means axially remote from said bracket members mounted within said shell and frictionally engaging the support arm transversely of said major axis whereby the mirror head may be retained in various rotated and inclined positions relative to said support arm major axis through the frictional engagement between said means and said support arm.

5. An adjustable mirror assembly comprising a casing, a mirror member secured to said casing, said casing including a wall portion laterally spaced from said mirror member, a casing support arm extending through an opening in said casing and terminating in an end disposed intermediate said casing wall portion and said mirror, said support arm including a major longitudinal axis, and an elongated U-shaped spring element mounted upon said casing wall portion and frictionally engaging the support arm proximate said end thereof, said elements being shiftable transversely of said support arm axis with said casing.

6. An adjustable mirror assembly comprising a mirror head having a shell open on one side and a mirror member mounted within the open side of said shell, said shell and said mirror member cooperating to define an open space therebetween, a mirror head support arm extending through an opening in said shell and terminating in an end disposed within said open space, means disposed on said shell and circumferentially engaging said support arm to allow said shell to be tilted and rotated relative to said arm, and a spring member fixed upon said shell and projecting within said open space, said spring member being biased into frictional and sliding engagement with said support arm whereby said shell is frictionally retained in any one of a variety of tilted and rotated positions relative to said support arm to adjust the rearward field of view of the mirror member.

* * * * *